(12) United States Patent
Kashimura et al.

(10) Patent No.: US 10,491,756 B2
(45) Date of Patent: Nov. 26, 2019

(54) INFORMATION PROCESSING APPARATUS, INFORMATION PROCESSING METHOD, AND NON-TRANSITORY COMPUTER READABLE RECORDING MEDIUM

(71) Applicant: NS Solutions Corporation, Tokyo (JP)

(72) Inventors: Takuya Kashimura, Tokyo (JP); Shinya Ishikawa, Tokyo (JP); Marie Sakai, Tokyo (JP); Masaru Yokoyama, Tokyo (JP); Osamu Shimoda, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 170 days.

(21) Appl. No.: 15/579,537

(22) PCT Filed: May 31, 2016

(86) PCT No.: PCT/JP2016/065978
§ 371 (c)(1),
(2) Date: Dec. 4, 2017

(87) PCT Pub. No.: WO2016/194889
PCT Pub. Date: Dec. 8, 2016

(65) Prior Publication Data
US 2018/0159988 A1 Jun. 7, 2018

(30) Foreign Application Priority Data
Jun. 3, 2015 (JP) .................................. 2015-113338

(51) Int. Cl.
*G06K 9/00* (2006.01)
*G06K 9/46* (2006.01)
(Continued)

(52) U.S. Cl.
CPC ......... *H04N 1/00005* (2013.01); *G06F 11/36* (2013.01); *G06K 9/00449* (2013.01);
(Continued)

(58) Field of Classification Search
CPC ............. G06K 9/00268; G06K 9/6256; G06K 9/00906; G06N 20/00; G06T 2207/10028
(Continued)

(56) References Cited

U.S. PATENT DOCUMENTS 7,076,491 B2 * 7/2006 Tsao .......................... G06F 8/71
715/255
7,185,283 B1 * 2/2007 Takahashi ............ G11B 27/034
715/723
(Continued)

FOREIGN PATENT DOCUMENTS

EP 2 731 015 A2 5/2014
JP 2001-273168 A 10/2001
(Continued)

OTHER PUBLICATIONS

Written Opinion issued in corresponding Singapore Application No. 11201709992U dated Aug. 2, 2018.
(Continued)

*Primary Examiner* — Charlotte M Baker
(74) *Attorney, Agent, or Firm* — Arent Fox LLP

(57) ABSTRACT

An information processing apparatus includes: a first acquirer configured to acquire a first image displayed on a display in response to execution of an object program being a test object; an object image extractor configured to extract a partial image as an object image from the first image, based on first specification information specifying the partial image, the partial image being included in the first image and corresponding to a correct image; a determiner configured to determine whether or not the object image and the
(Continued)

correct image accord; and a display processor configured to display a result of determination by the determiner.

17 Claims, 14 Drawing Sheets

(51) Int. Cl.
  *H04N 1/00* (2006.01)
  *G06F 11/36* (2006.01)
(52) U.S. Cl.
  CPC ..... *G06K 9/00463* (2013.01); *G06K 9/00483* (2013.01); *H04N 1/0066* (2013.01)
(58) Field of Classification Search
  USPC .................................................. 382/100, 190
  See application file for complete search history.

(56) References Cited

U.S. PATENT DOCUMENTS

| | | | | |
|---|---|---|---|---|
| 7,545,973 | B2* | 6/2009 | Hamanaka | G06K 9/00288 382/118 |
| 7,809,159 | B2* | 10/2010 | Ishiyama | G06T 7/70 382/103 |
| 8,988,745 | B2* | 3/2015 | Hamada | H04N 1/00087 358/406 |
| 10,127,473 | B2* | 11/2018 | Sano | G06F 19/321 |
| 2004/0052413 | A1* | 3/2004 | Kunii | G06K 9/00791 382/159 |
| 2007/0140529 | A1* | 6/2007 | Iwabuchi | G06T 7/231 382/107 |
| 2009/0123025 | A1 | 5/2009 | Deng et al. | |

FOREIGN PATENT DOCUMENTS

| | | |
|---|---|---|
| JP | 2005-266954 A | 9/2005 |
| JP | 2009-134406 A | 6/2009 |
| JP | 2011-076152 A | 4/2011 |

OTHER PUBLICATIONS

Shinya Kasatani, "Hot Tool 'Selenium', Automating the Test Diligent Testing Holds the Key for Early Detection of Bugs", Nikkei Software, vol. 10, No. 4, pp. 70 to 79, ISSN 1347-4686, Feb. 24, 2007.

* cited by examiner

QUESTION 1
Create controller that issues alert when element of btn class in element of content class is clicked, and describe code that binds to element of content class.

```
<div class="content">
 <button class="btn">
 button in content
 </button>
</div>
<button class="btn">
button outside content
</button>
```
— 411

[SEE HINT] ◄

ANSWER COLUMN  EXECUTION RESULT
Click button to confirm that event handler operates

[EXECUTE]  [button in content] [button outside content]
— 412

ANSWER AND EXPLANATION
Answer and explanation are displayed here. — 413

---

420

QUESTION 1
Create controller that issues alert when element of btn class in element of content class is clicked, and describe code that binds to element of content class.

```
<div class="content">
 <button class="btn">
 button in content
 </button>
</div>
<button class="btn">
button outside content
</button>
```
— 421

[SEE HINT] ◄

ANSWER COLUMN  EXECUTION RESULT
Click button to confirm that event handler operates

[EXECUTE]  [button in content]
— 422

ANSWER AND EXPLANATION
Answer and explanation are displayed here. — 423

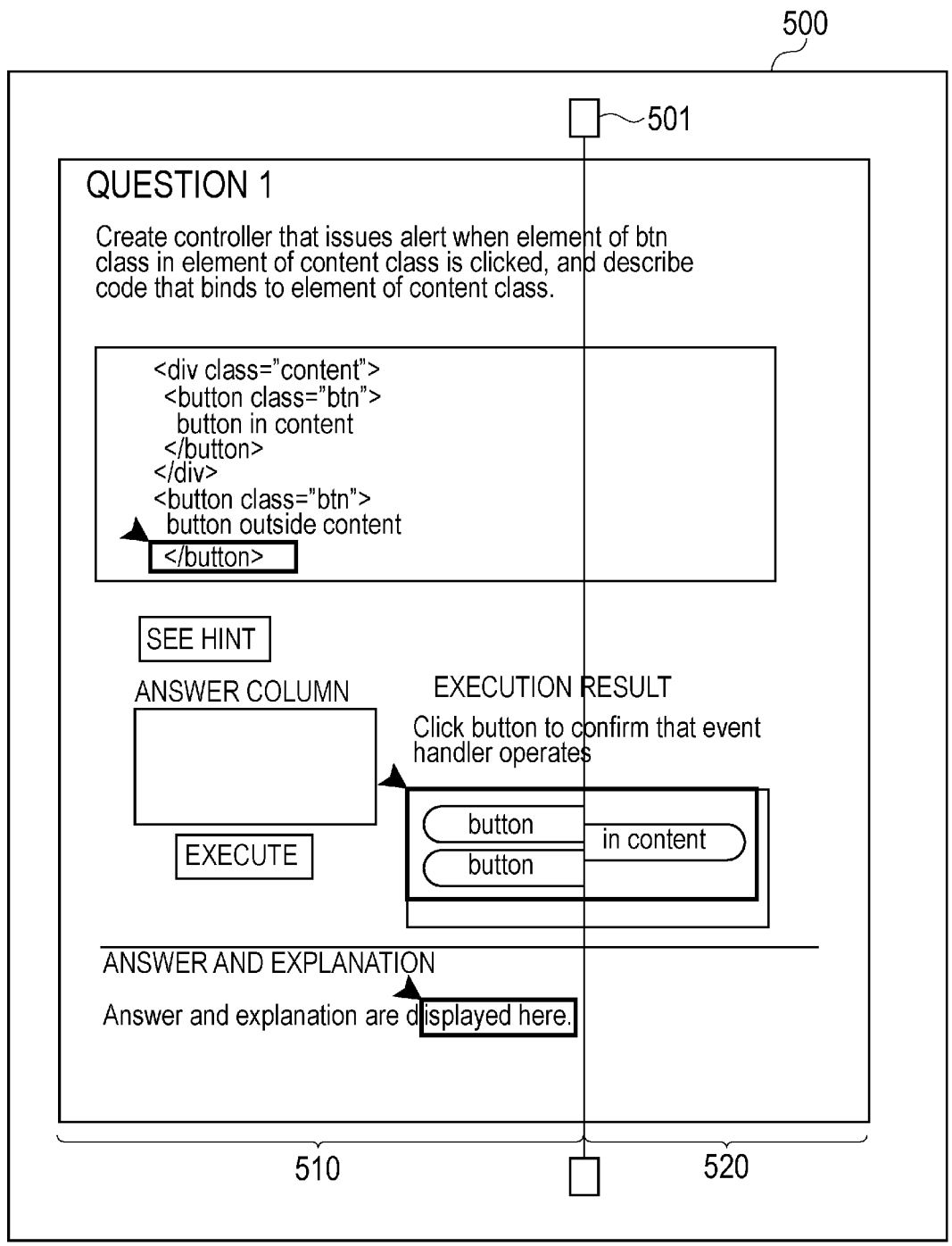

EXPECTED ━━━  ACTUAL ▭▭▭▭▭

```
<div class="content">
    <button class="btn">
    button in content
    </button>
</div>
<button class="btn">
    button outside content
</button>
```

EXECUTION RESULT

Click button to confirm that event handler operates

CORRECT ENTIRE IMAGE

OBJECT ENTIRE IMAGE

INFORMATION PROCESSING APPARATUS, INFORMATION PROCESSING METHOD, AND NON-TRANSITORY COMPUTER READABLE RECORDING MEDIUM

CROSS-REFERENCE TO RELATED APPLICATIONS

This application is a National Stage entry of International Application No. PCT/JP2016/065978, filed May 31, 2016, which claims priority to Japanese Patent Application No. 2015-113338, filed Jun. 3, 2015. The disclosures of the priority applications are incorporated in their entirety herein by reference.

TECHNICAL FIELD

The present invention relates to an information processing apparatus, an information processing method, and a non-transitory computer readable recording medium.

BACKGROUND ART

Recently, a GUI becomes enhanced, and a technique of outputting an execution result of a computer program by an image is also known. Further, in developing a system for a computer or the like, a test for checking whether or not the system normally operates is conventionally performed. Execution of the test has a problem of a burden put on a test manager such as preparation for the test, execution of the test, checking of results and so on. Hence, recently, a simple test by image comparison is increasingly performed. Patent Literature 1 discloses a technique of verifying an execution result of a computer program by image comparison. The technique in Patent Literature 1 performs image comparison after removing designated mask regions from two images created by the execution of the computer program respectively, and displays a comparison result.

CITATION LIST

Patent Literature

Patent Literature 1: Japanese Laid-open Patent Publication No. 2009-134406

SUMMARY OF INVENTION

Technical Problem

However, there is also an anticipated case where though a partial image in an image displayed by a test object program and a partial image in an image displayed by a correct program accord, their display positions are different. In such a case, it is desired in some cases to determine that the program normally runs by regarding the partial images as according.

The present invention has been made in consideration of the above problem, and its object is to appropriately execute verification of a program including a description relating to drawing of an image.

Solution to Problem

Hence, the present invention is an information processing apparatus including: a first acquirer configured to acquire a first image displayed on a display in response to execution of an object program being a test object; an object image extractor configured to extract a partial image as an object image from the first image, based on first specification information specifying the partial image, the partial image being included in the first image and corresponding to a correct image; a determiner configured to determine whether or not the object image and the correct image accord; and a display processor configured to display a result of determination by the determiner.

Advantageous Effects of Invention

According to the present invention, it is possible to appropriately execute verification of a program including a description relating to drawing of an image.

BRIEF DESCRIPTION OF DRAWINGS

FIG. 4 is a view illustrating a display example of a test result.
FIG. 5 is a view illustrating another display example of the test result.

DESCRIPTION OF EMBODIMENTS

Figure 1:
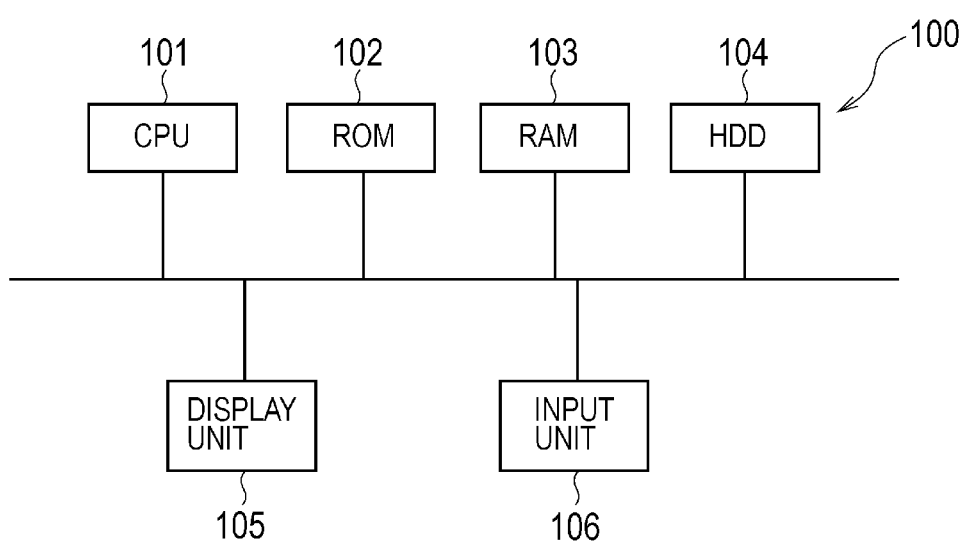
FIG. 1 is a diagram illustrating a hardware configuration of a test apparatus.

Embodiments of the present invention will be described below referring to the drawings.

A test apparatus 100 according to this embodiment is an apparatus that tests (verifies) whether or not a program being a test object normally runs. Hereinafter, a test object program will be called an object program. The test apparatus 100 executes a correct program prepared for the object program and executes the object program, and compares images obtained from the respective programs with each other. In this event, the comparison is performed not for the entire images obtained from the respective programs, but the image comparison is performed in units of partial image. Note that, for example, when a program after version upgrade is regarded as the object program, the test apparatus 100 can use the program before the version upgrade as the correct program. Note that the object program that is regarded as the test object by the test apparatus 100 according to this embodiment and the correct program corresponding to the object program include processing of displaying images.

FIG. 1 is a diagram illustrating a hardware configuration of the test apparatus 100 as an information processing apparatus. The test apparatus 100 has a CPU 101, a ROM 102, a RAM 103, an HDD 104, a display unit 105, and an input unit 106. The CPU 101 reads a control program stored in the ROM 102 and executes various kinds of processing. The RAM 103 is used as a main memory and a temporary storage area of the CPU 101. The HDD 104 stores various kinds of information such as image data, various kinds of programs and so on. The display unit 105 displays various kinds of information. The input unit 106 has a keyboard and a mouse and accepts various kinds of operations by a user. Note that later-described functions and processing of the test apparatus 100 are realized by the CPU 101 reading the program stored in the ROM 102 or the HDD 104 and executing the program.

Figure 2:
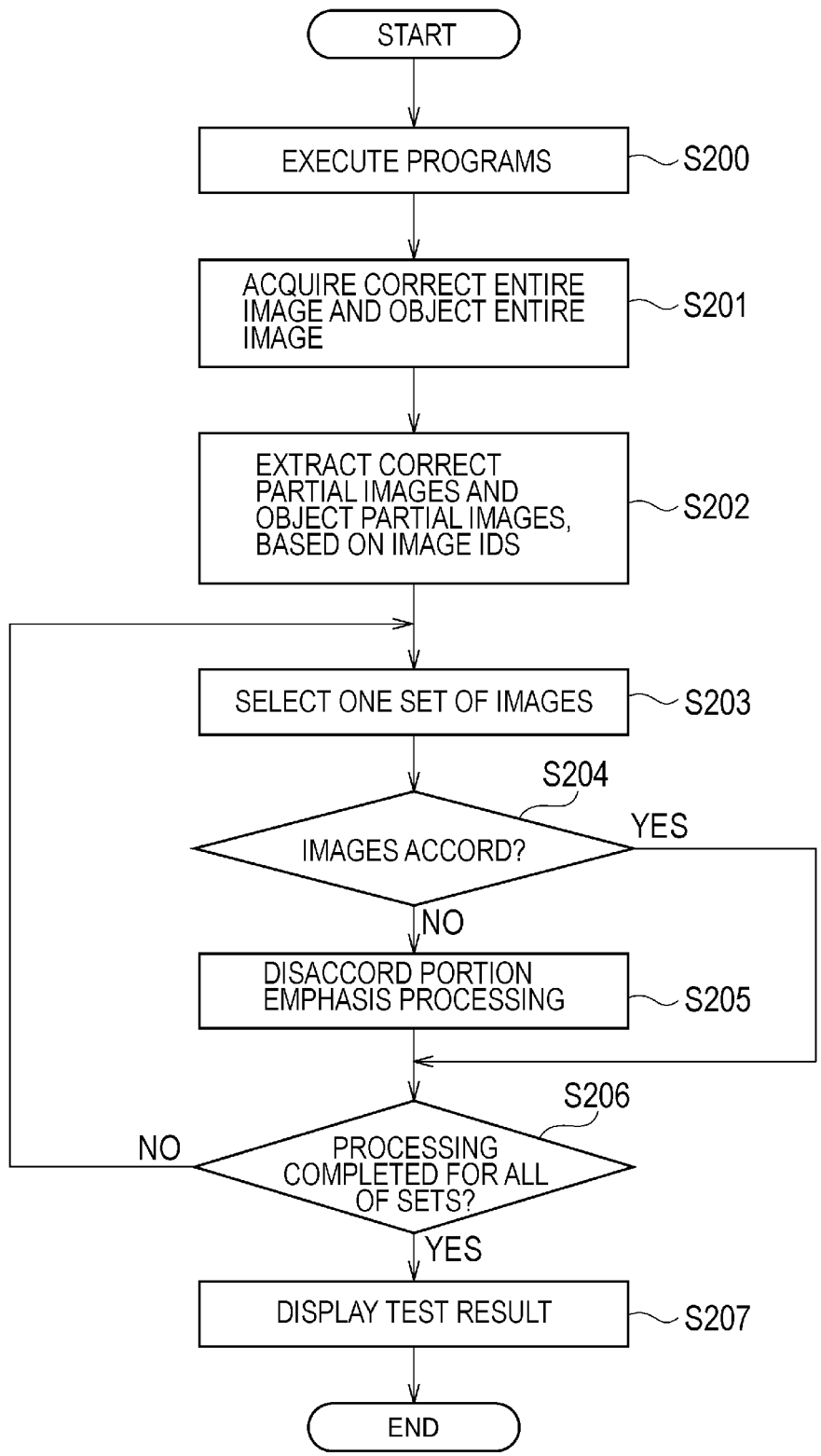
FIG. 2 is a flowchart illustrating verification processing.

FIG. 2 is a flowchart illustrating verification processing by the test apparatus 100. The verification processing mentioned herein is processing realized by a computer of the test apparatus 100 executing a verification program. At S200, the CPU 101 starts execution of the object program and the correct program. Note that the CPU 101 starts execution of the object program and the correct program, for example, upon accepting a start instruction from the user via the input unit 106.

The object program and the correct program include descriptions relating to drawing of images. Execution of draw commands relating to the descriptions is performed by a browser application (hereinafter, referred to simply as a browser). More specifically, the CPU 101 executes the object program to thereby display the image on the display unit 105 by using the browser. The CPU 101 similarly executes the correct program to thereby display the image on the display unit 105 by using the browser. Hereinafter, the image drawn and displayed by execution of the object program is referred to as an object entire image. Besides, the image drawn and displayed by execution of the correct program is referred to as a correct entire image. Note that timings of executing the object program and the correct program are not particularly limited, but one of the programs may be executed first or the programs may be executed at the same time.

Figure 3:
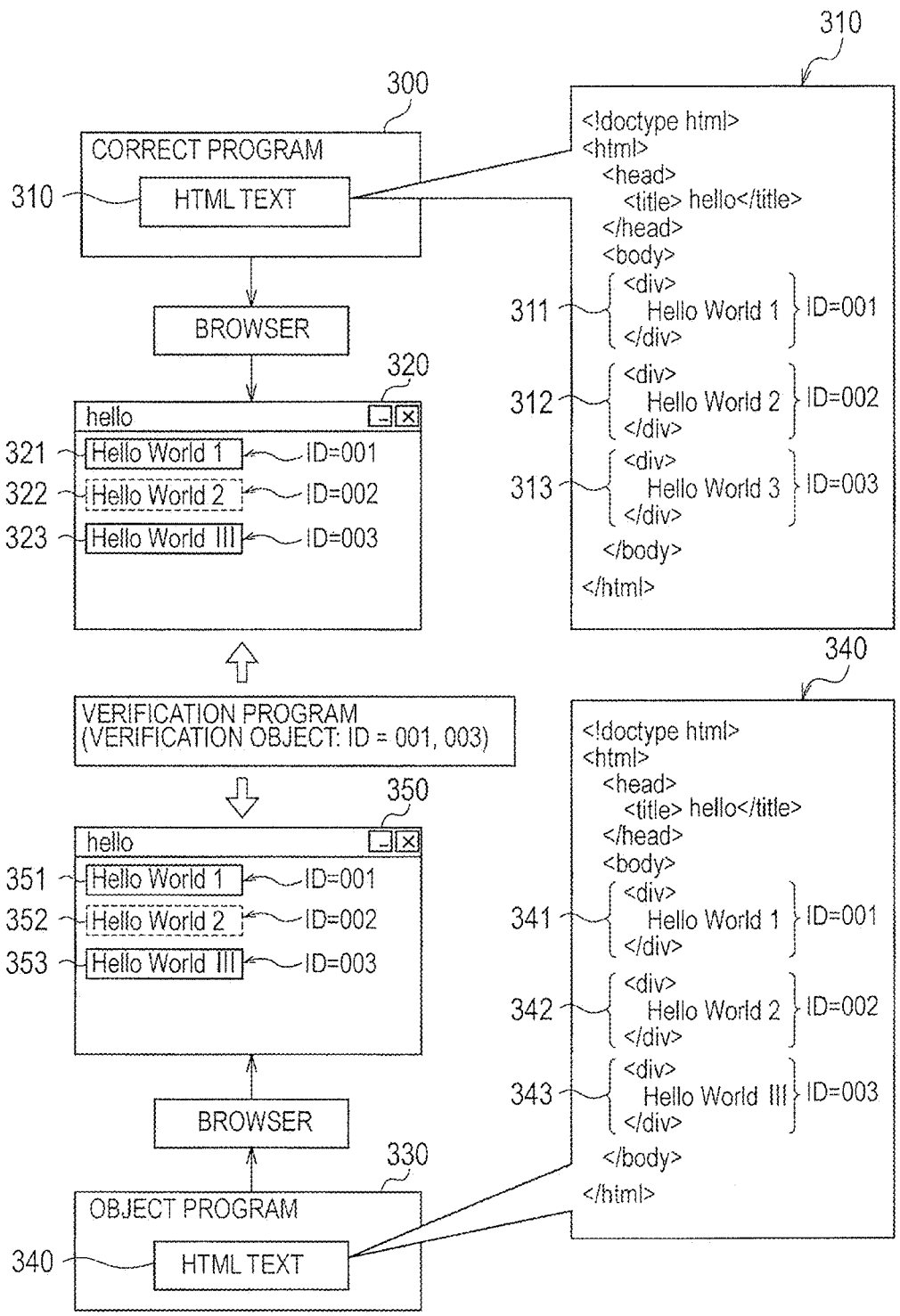
FIG. 3 is an explanatory view of processing relating to execution of a correct program and an object program.

FIG. 3 is an explanatory view of processing relating to execution of the correct program and the object program. Upon execution of a correct program 300, the browser interprets an HTML text 310 in the correct program 300 and sends a draw command to an OS (operation system). In response to the draw command, the OS draws an image corresponding to the HTML text 310, namely, a correct entire image 320. In the example in FIG. 3, the correct entire image 320 includes partial images 321, 322, 323. The partial images 321, 322, 323 mentioned here are images drawn corresponding to descriptions 311, 312, 313 associated with image IDs "001", "002", "003" in the HTML text 310.

Upon execution of an object program 330, the browser similarly interprets an HTML text 340 in the object program 330 and sends a draw command to the OS (operation system). In response to the draw command, the OS draws an image corresponding to the HTML text 340, namely, an object entire image 350. In the example in FIG. 3, the object entire image 350 includes partial images 351, 352, 353. The partial images 351, 352, 353 mentioned here are images drawn corresponding to descriptions 341, 342, 343 associated with image IDs "001", "002", "003" in the HTML text 340.

Further, in this embodiment, partial images being verification objects, namely, comparison objects in the correct entire image and the object entire image are defined in advance in the verification program. In this embodiment, image IDs are defined as information for specifying partial images being the verification objects, namely, specification information in the verification program. This means that a partial image drawn according to a description associated with an image ID is set as a verification object. For example, when the image IDs "001", "003" are defined in the verification program as illustrated in FIG. 3, the partial images 321, 323 in the correct entire image and the partial images 351, 353 in the object entire image are the partial images being the verification objects. Note that, hereinafter, the partial image being the verification object in the correct entire image is referred to as a correct partial image, and the partial image being the verification object in the object entire image is referred to as an object partial image.

Further, the correct partial image and the object partial image specified by the same image ID become comparison objects, namely, a set of objects to be determined whether or not both images accord. More specifically, in the example in FIG. 3, the correct partial image 321 and the object partial image 351 form a set, and the correct partial image 323 and the object partial image 353 form a set. Note that the image units of the correct partial image and the object partial image are not limited to those in the embodiment. For example, an image made by combining the partial image 321 and the partial image 322 may be defined as one correct partial image in the verification program.

Though this embodiment will be described using, as an example, a case where the same image ID is assigned to a correct partial image and an object partial image that is supposed to be equal to the correct partial image in the correct program and the object program, there is a case where verification needs to be performed by comparing the correct partial image and the object partial image associated with different image IDs. In this case, a creator, a verifier or the like of the object program only needs to define different image IDs as the correct partial image and the object partial image in the verification program. Note that the object partial image and the correct partial image are images being the comparison objects in this embodiment, and are examples of an object image and a correct image, respectively. Further, the image ID is an example of an identifier that identifies an image.

Returning to FIG. 2, after the processing at S200, the CPU 101 advances the processing to S201. At S201, the CPU 101 acquires a screenshot of the correct entire image and a screenshot of the object entire image, which are displayed on the display unit 105, as the correct entire image and the object entire image, respectively.

Next, at S202, the CPU 101 extracts partial images specified by image IDs defined in the verification program as correct partial images from the correct entire image (correct image extraction processing). The CPU 101 similarly extracts partial images specified by image IDs defined in the verification program as object partial images from the object entire image (object image extraction processing).

Hereinafter, the processing of extracting the correct partial image from the correct entire image will be described in detail. The CPU 101 inquires of the browser a position and a size of a correct partial image while designating an image ID. In response to the inquiry, the browser executes again the draw command of the correct program, and specifies a position and a size of a region drawn based on the description of the HTML text associated with the designated image ID. Note that a coordinate system for the position and size specified here accords with a coordinate system of a position and a size on the screenshot acquired at S201. The browser further specifies a rectangular or square region as a region of the correct partial image. The browser then returns information indicating an upper left vertex and longitudinal and lateral lengths of the region of the correct partial image as information indicating the specified position and size, to the CPU 101. The CPU 101 extracts the correct partial image from the correct entire image acquired at S201, based on the position and size received from the browser.

For example, in the example in FIG. 3, the CPU 101 makes an inquiry with specified image IDs "001", "003" to the browser. The browser specifies regions of the partial images 321, 323 drawn according to the descriptions 311, 313 of the correct program corresponding to the image IDs "001", "003", specifies positions and sizes of the regions of the partial images 321, 323, and returns the specified positions and sizes to the CPU 101. The CPU 101 then extracts the partial images 321, 323 from the correct entire image 320.

Note that the information indicating the position and size of the region of the correct partial image is not limited to that in the embodiment. Another example of the partial image information may be information indicating positions of opposite vertices (two points). Besides, the shape of the region specified by the browser as the region where the correct partial image is drawn is not limited to that in the embodiment. As another example of the shape, the browser may specify a circular or triangular region as the region of the correct partial image. When the browser specifies a circular region, the browser only needs to return information indicating a center position and a radius of a circle as the information indicating the position and size thereof to the CPU 101. Besides, when the browser specifies a triangular region, the browser only needs to return information indicating positions of three points as the information indicating the position and size thereof to the CPU 101.

The processing of extracting the correct partial images from the correct entire image at S202 has been described in the above, and processing of extracting the object partial images from the object entire image is the same as the processing of extracting the correct partial image from the correct entire image.

The CPU 101 extracts partial images (regions) drawn according to the descriptions associated with the image IDs of the description of the HTML text of the correct program as the correct partial images through use of the image IDs defined in the verification program as search keys as described above. The CPU 101 similarly extracts partial images (regions) drawn according to the descriptions associated with the image IDs of the description of the HTML text of the object program as the object partial images through use of the image IDs defined in the verification program as search keys. Therefore, the test apparatus 100 can correctly extract the partial images corresponding to each other even in the case where the positions of the object partial images in the object entire image differ from the positions of the correct partial images in the correct entire image.

Returning to FIG. 2, after the processing at 202, the CPU 101 selects the object partial image and the correct partial image corresponding to the same ID which have been extracted at S202, as one set, at S203. In the example in FIG. 3, for example, the correct partial image 321 and the object partial image 351 are selected as a set. Then, at S204, the CPU 101 compares the object partial image and the correct partial image selected at S203 and determines whether or not both the images accord. When both the images accord (Yes at S204), the CPU 101 advances the processing to S206. When both the images do not accord (No at S204), the CPU 101 advances the processing to S205.

The CPU 101 compares pixel values of corresponding pixels of both the images, and determines whether or not both the images accord, based on a result of the comparison. In the comparison between the pixel values of the pixels, when a difference between the pixel values is less than a threshold value, the CPU 101 determines that both pixels accord, and when pixel values of all of corresponding pixels accord, the CPU 101 determines that both the images accord. There is a case where even if there is a certain degree of difference between the pixel values, both the images may be regarded as according. In this case, it is only necessary to set a comparatively large value as the threshold value. The basis for determining that both the images accord as described above can be freely set according to a result required by the user.

As another example, the CPU 101 may determine that both the images accord when the number of pixels where both the pixels accord is a threshold value or more. As still another example, the CPU 101 may remove noise in the correct partial image and the object partial image before the comparison between the pixel values.

At S205, the CPU 101 performs emphasis processing on a disaccord portion of the object partial image which does not accord with the correct partial image. The CPU 101 similarly performs emphasis processing on a disaccord portion of the correct partial image which does not accord with the corresponding object partial image. In this embodiment, the CPU 101 displays an emphasis frame surrounding the disaccord portion in a superimposed manner. The emphasis processing, however, only needs to be processing of changing the disaccord portion into a display form discriminable from other portions so that the user can easily specify the disaccord portion, and concrete processing is not limited to that in the embodiment. Another example of the emphasis display can be processing of changing a display color of the disaccord portion.

Next, at S206, the CPU 101 confirms whether or not the processing at S204, S205 has been completed for all of sets of the object partial images and the correct partial images which have been extracted at S202. When the processing has been completed for all of the sets (Yes at S206), the CPU 101 advances the processing to S207. When unprocessed sets exist (No at S206), the CPU 101 advances the processing to S203. In this case, at S203, the CPU 101 selects the unprocessed sets and continues subsequent processing.

At S207, the CPU 101 displays a determination result as a test result (display processing). In this embodiment, when a disaccord portion is detected, the CPU 101 displays the object entire image and correct entire image after the emphasis processing, as the test result. Besides, when any disaccord portion is not detected, the CPU 101 displays the object entire image and correct entire image with no emphasis processing performed thereon as the test result. Note that the CPU 101 only needs to be able to display an image where the use can identify the disaccord portion in the object partial image at S207, and may display, for example, only the object partial images and the correct partial images. As another example, the CPU 101 may display only the object partial images or only the object partial image indicating the disaccord portion. As still another example, the CPU 101 may display both the object partial images and the correct partial images together with the object entire image and the correct entire image.

FIG. 4 is a view illustrating a display example of the test result. A test result screen 400 indicating the rest result is displayed on the display unit 105. A correct entire image 410 is displayed on the left side in the test result screen 400, and an object entire image 420 is displayed on the right side in the test result screen 400. In the example in FIG. 4, three disaccord portions are detected, and the emphasis frame is displayed in a superimposed manner at each of the disaccord portions. An emphasis frame 411 in the correct entire image 410 and an emphasis frame 421 in the object entire image 420 are emphasis frames superimposed on corresponding disaccord portions. In regions corresponding to the emphasis frames 411, 421, fonts of </button> are different between the images. Other emphasis frames 412, 413 are displayed in the correct entire image 410, and emphasis frames 422, 423 corresponding to the emphasis frames 412, 413 respectively are displayed in the object entire image 420. In regions corresponding to the emphasis frames 412, 422, positions of "button in content" are different. In addition, both the images are different also in that "button outside content" in the region corresponding to the emphasis frame 412 does not exist in the region corresponding to the emphasis frame 422. Further, in regions corresponding to the emphasis frames 413, 423, both the images are different in that "displayed here" is displayed in a region corresponding to the emphasis frame 413, whereas " ddisplayed here" is displayed in a region corresponding to the emphasis frame 423. Since the emphasis frames are displayed as described above, the user can easily specify the disaccord portions.

FIG. 5 is a view illustrating another display example of the test result. A test result screen 500 indicating the rest result is displayed on the display unit 105. A bar 501 movable right and left in response to a user operation is displayed in a superimposed manner on the test result screen 500. An object entire image 520 is displayed on the right side of the bar 501, and a correct entire image 510 is displayed on the left side of the bar 501. In the display example in FIG. 5, contents disaccording between the correct entire image 510 and the object entire image 520 can be confirmed by moving the bar 501 without moving a line of sight. Note that emphasis frames are displayed in a superimposed manner at disaccord portions also in the test result screen 500.

As described above, the test apparatus 100 according to this embodiment can compare the object image obtained from the object program and the correct image in units of partial image. Accordingly, even if the position of the correct partial image in the correct entire image and the position of the object partial image in the object entire image are different, both the images can be determined to accord when the correct partial image and the object partial image accord. Depending on a test case, only when images of the corresponding correct partial image and object partial image accord, it is desired to determine that the images accord in some cases even if their positions are deviated from each other. In this embodiment, determination of accord or disaccord can be made by comparison between the images regardless of their positions in such a case.

As a first modification example of the test apparatus 100 according to this embodiment, at S204, the CPU 101 may perform comparison between edges detected from the correct partial image and the object partial image respectively, in place of the comparison between the pixel values. More specifically, the CPU 101 performs edge detection in each of the object partial image and the correct partial image to obtain two edge images. The edge image mentioned here is an image indicating an edge detected from an image. The CPU 101 then compares the two edge images, and only needs to determine that the object partial image and the correct partial image accord when both the images accord.

Figures 6A, 6B:
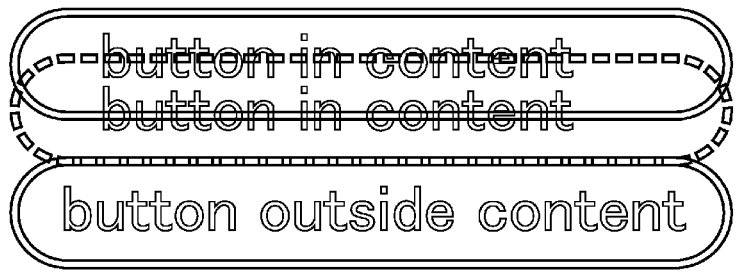
FIG. 6A is a view illustrating a display example of the test result in the case of using edge detection.
FIG. 6B is a view illustrating a display example of the test result in the case of using edge detection.

FIG. 6A, FIG. 6B are views illustrating display examples of the test result in the case of using the edge detection. As illustrated in FIG. 6A, FIG. 6B, two edge images are displayed in a superimposed manner. Thus, in the two edge images, one edge image is displayed for a portion where edges accord, and respective edge images are displayed for a portion where edges do not accord. Therefore, the user can easily specify the disaccord portion. The CPU 101 may further display an edge at an accord portion in black, an edge of the correct entire image of a disaccord portion in blue, and an edge of the object entire image of the disaccord portion in red. This makes it possible to more clearly indicate the accord portion and the disaccord portion.

As a third modification example, a position in a structure of the HTML text may be defined, in place of the image ID, as the specification information on the correct partial image and the object partial image which are the verification objects in the verification program. The HTML text mentioned here is one example of a structured document. In this case, the CPU 101 inquires positions and sizes of the correct partial image and the object partial image while designating the positions in the structures of the HTML texts. In response to the inquiry, the browser specifies the position and the size of a region drawn based on the description at the designated position. The browser only needs to return information indicating the specified position and size to the CPU 101. This also applies to the object partial image.

As a fourth modification example, the CPU 101 does not have to execute, every time when executing an object program, a correct program corresponding thereto. For example, when the CPU 101 has already executed the correct program and acquired the correct entire image and extracted the correct partial image, the CPU 101 only needs to execute only the object program to acquire the object entire image and extract the object partial image in the verification processing.

As a fifth modification example, the image to be compared with the object partial image is not limited to the partial image. For example, in the case where the object program is executed to verify whether or not a specific image can be displayed, it is only necessary to compare a specific image prepared in advance with the object partial image extracted from the object entire image. In this case, the specific image (entire image) is the correct image.

Second Embodiment

Next, a test apparatus 100 according to a second embodiment will be described. The test apparatus 100 according to the second embodiment has a plurality of determination conditions for determining that both images accord in comparison between an object partial image and a correct partial image, and can determine accord or disaccord between both the images according to a determination condition different for each object partial image. Hereinafter, the test apparatus 100 according to the second embodiment will be described about points different from the test apparatus 100 according to the first embodiment.

First of all, determination conditions that the test apparatus 100 according to the second embodiment can apply will be described. The test apparatus 100 according to this embodiment can allocate the following determination conditions to object partial images.

A first determination condition is for determining that both the images accord when the object partial image and the correct partial image, which form a set, accord as a whole as described in the first embodiment. Note that the test apparatus 100 can set also a determination condition in which the condition for determining accord (for example, the threshold value for the difference between pixel values for determining accord or the like) is different as described in the first embodiment.

Figure 7:
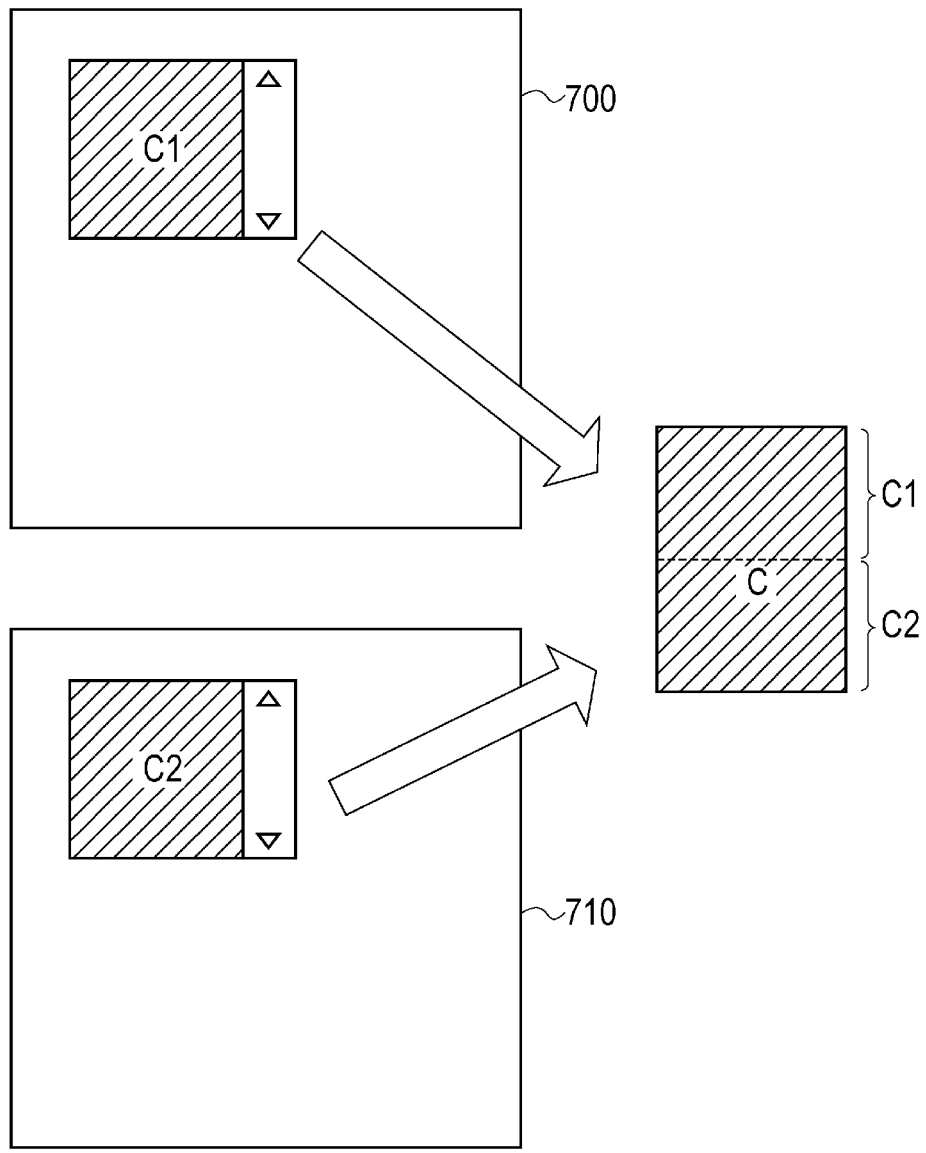
FIG. 7 is an explanatory view of a determination condition.

A second determination condition is for determining that both the images accord by comparing the whole object partial image realized by a scroll display and the correct partial image in the case where one object partial image is scroll-displayed in the object entire image. FIG. 7 is an explanatory view of the second determination condition. When the object partial image cannot be obtained from one object entire image as in FIG. 7, a CPU 101 extracts a "c1" portion from an object entire image 700 where "c1" being a part of an object partial image "c" is displayed. The CPU 101 further extracts a "c2" portion from an object entire image 710 where "c2" being a portion other than the "c1" of the object partial image "c" is displayed. The CPU 101 then combines the extracted portions to thereby obtain the object partial image "c".

Note that in the case where one correct partial image is scroll-displayed in the correct entire image, the test apparatus 100 can set also a determination condition for comparing the whole correct image realized by scroll display and the object partial image. Further, in the case where the correct entire image and the object entire image are scroll-displayed, the test apparatus 100 can set also a determination condition of comparing the whole correct partial image and the whole object partial image which are realized by scroll display.

Figure 8A:
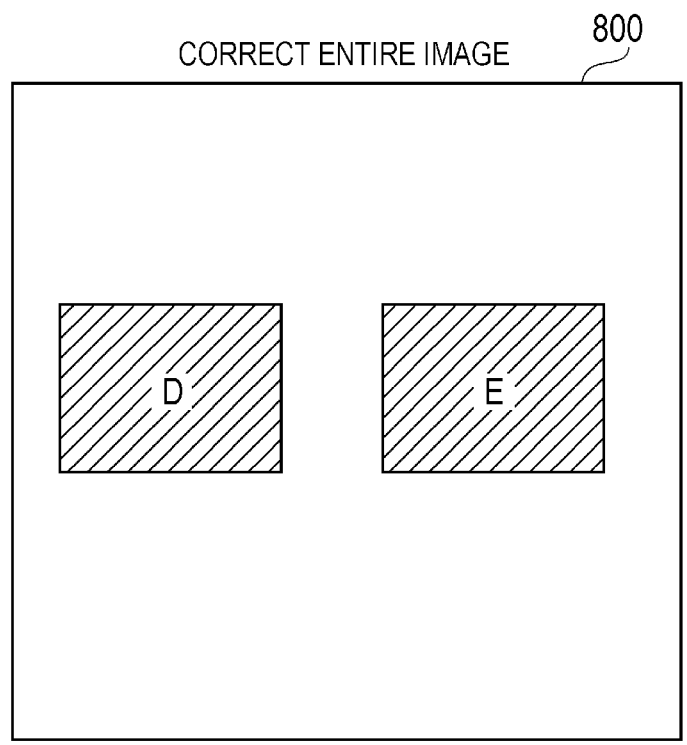
FIG. 8A is an explanatory view of a determination condition.
Figure 8B:
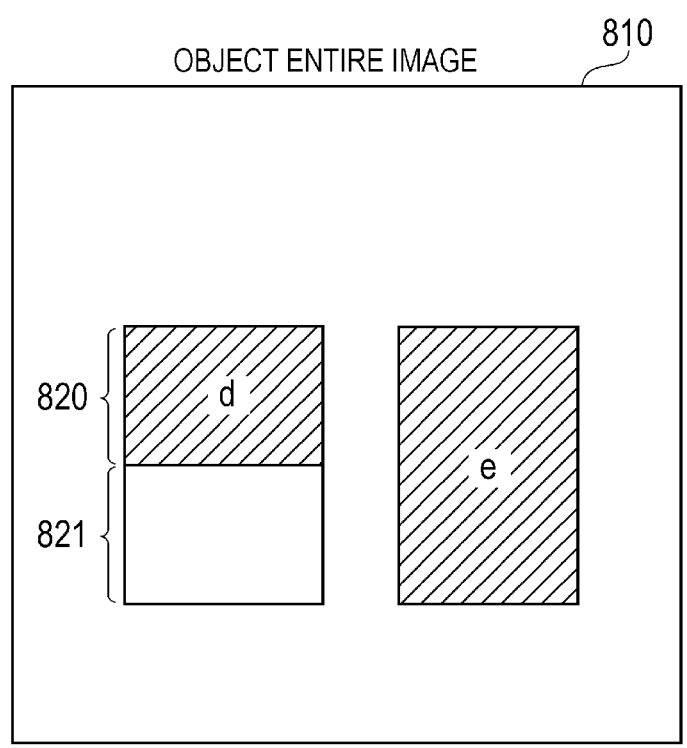
FIG. 8B is an explanatory view of the determination condition.

A third determination condition is for determining that both the images accord when a part of the object partial image and the correct partial image accord. One example of the third determination condition is for determining that both the images accord when a region except a lower side region of the object partial image and a corresponding correct partial image accord. FIG. 8A and FIG. 8B are explanatory views of this determination condition.

It is assumed that an object partial image "d" is expanded accompanying expansion of another partial image e in the longitudinal direction as in FIG. 8A and FIG. 8B. In this case, the object partial image "d" is drawn in a region 820 and a region 821 under the region 820 may become a blank space. In this case, the CPU 101 compares pixels of a correct partial image "D" and the object partial image "d" in order from a top, and determines whether or not both the images accord at a point in time when the comparison with all of the pixels of the correct partial image "D" ends. This makes it possible to determine whether or not both the images accord by the comparison between the object partial image "d" and the correct partial image "D" even if a blank space with unknown size is generated on the lower side.

Note that even when blank spaces are generated on the upper portion, the right side and the left side of the object partial image, the test apparatus 100 can set also a determination condition for determining whether or not both the images accord regardless of the sizes of the blank spaces.

Contrarily, there is a case where the correct partial image includes a blank space, whereas the blank space disappears in a corresponding object partial image. For coping with such a case, even when blank spaces are generated on the upper portion, the right side and the left side of the correct partial image, the CPU 101 can set also a determination condition for determining whether or not both the images accord regardless of the sizes of the blank spaces.

Figure 9:
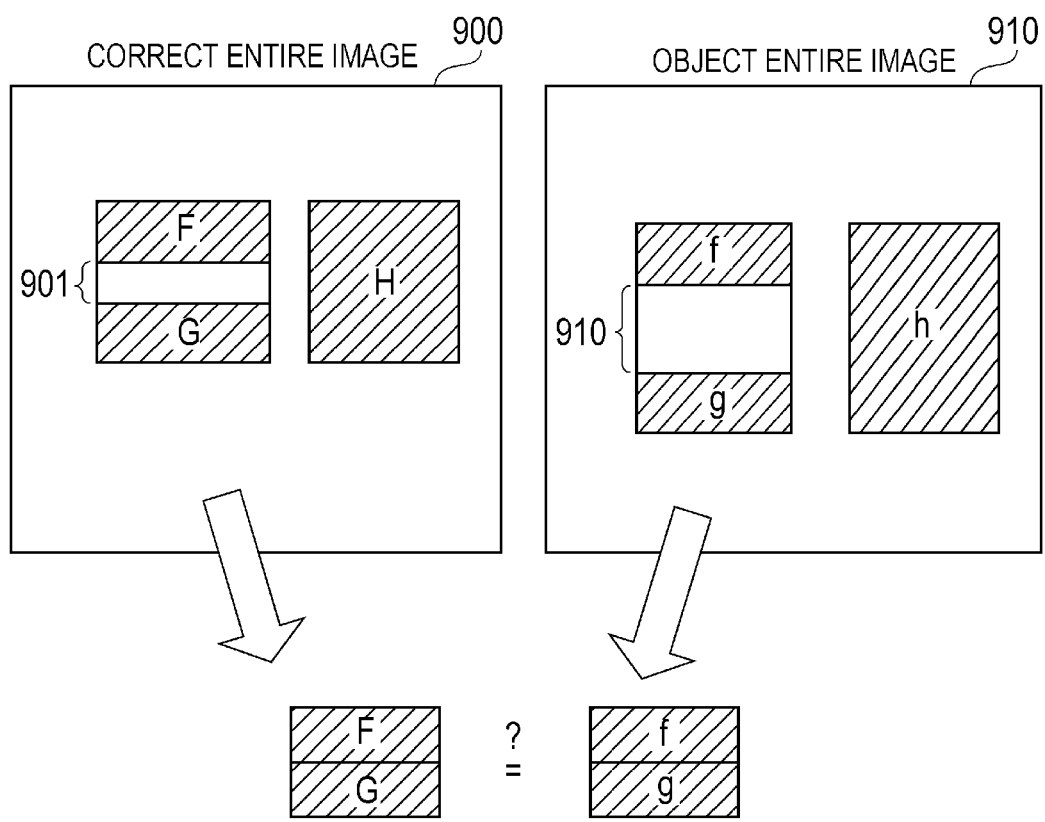
FIG. 9 is an explanatory view of a determination condition.

A fourth determination condition is for determining whether or not images accord, when the size of a blank space between two object partial images changes, by comparing the two object partial images after removing the blank space with a corresponding correct partial image. FIG. 9 is an explanatory view of the fourth determination condition. It is assumed that a blank space 901 between correct partial images "F" and "G" in a correct entire image 900 is expanded to a blank space 911 in an object entire image 910 accompanying expansion of a correct partial image "H" in the correct entire image 900 to an object partial image "h" in the object entire image 910. Also in this case, the test apparatus 100 compares the images of the correct partial images "F" and "G" with object partial image "f" and "g" after removing (trimming) the blank space. This enables an accord determination ignoring the blank space.

Figure 10A:
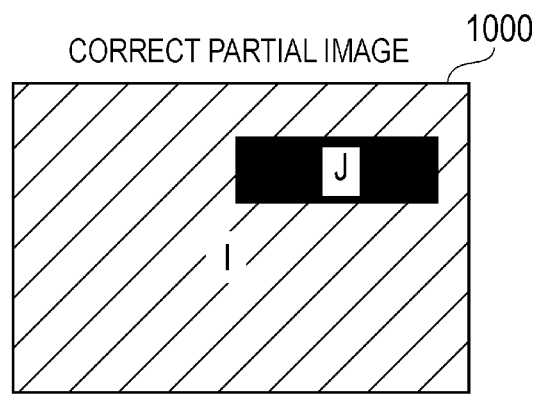
FIG. 10A is an explanatory view of a determination condition.
Figure 10B:
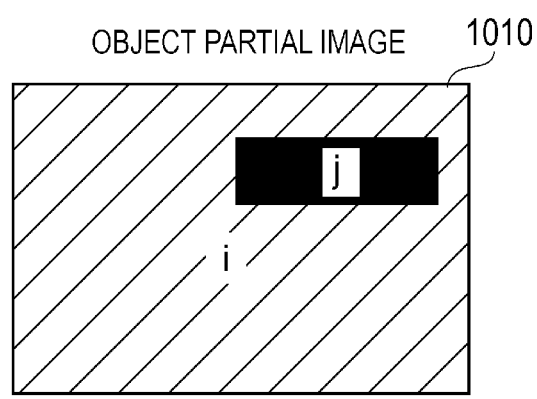
FIG. 10B is an explanatory view of the determination condition.

A fifth determination condition is for determining that both the images accord even if partial regions of the correct partial image and the object partial image do not accord. FIG. 10A and FIG. 10B are explanatory views of the fifth determination condition. It is assumed that information different for every execution of the program such as each log-in date and time is displayed in a region "J" of a correct partial image 1000 and a region "j" of an object partial image 1010 corresponding thereto. In this case, the CPU 101 determines, using the region "J" and the region "j" as mask regions, that both the images accord when a correct partial image "I" and an object partial image "i" other than the mask regions accord. Note that the mask regions are associated with the image ID in the program as with the object partial image and the like. Accordingly, the CPU 101 can specify the mask regions by inquiring of the browser. Note that, as another example, the CPU 101 may determine that the correct partial image "I" and the object partial image "i" including the mask regions accord, after making all of pixels in the mask regions "J", "j" into equal pixels such as into black pixels.

Figure 11:
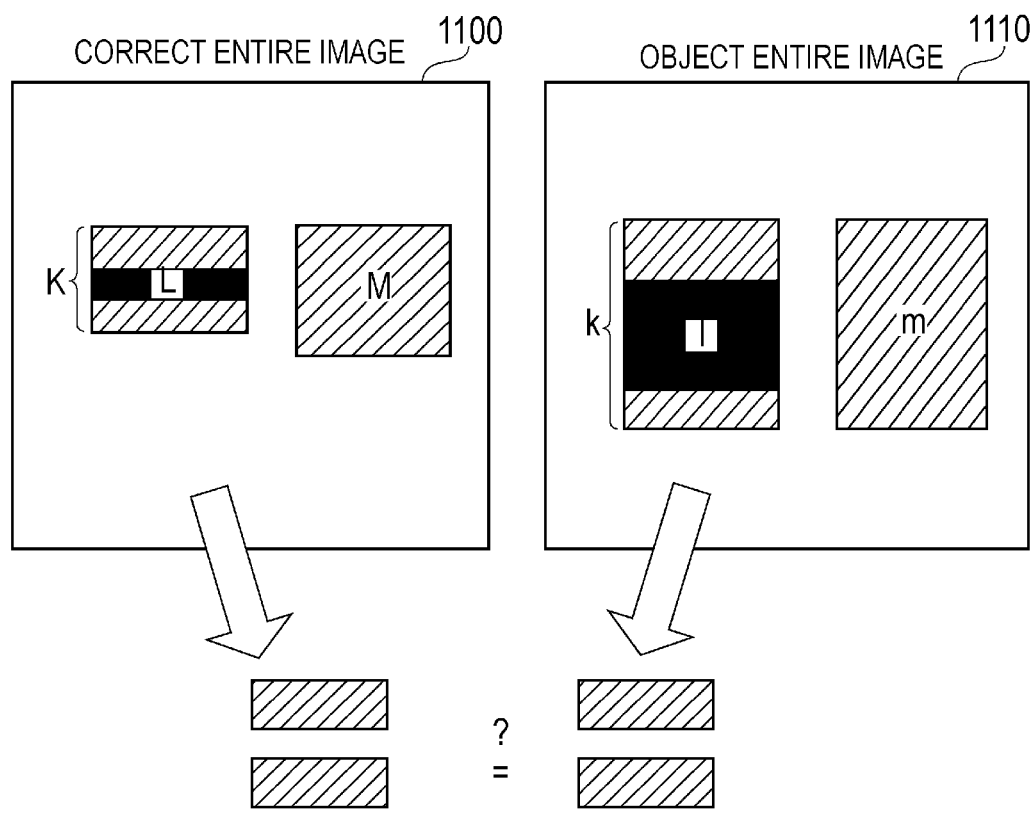
FIG. 11 is an explanatory view of a determination condition.

A sixth determination condition is for comparing the object partial image and the correct partial image after removing the mask regions also in a case where the size of the mask region changes. FIG. 11 is an explanatory view of the sixth determination condition. It is assumed that a mask region "l" of an object entire image 1110 corresponding to a mask region "L" of a correct partial image "K" in a correct entire image 1100 is expanded accompanying expansion of a partial image "m" in the longitudinal direction. Also in this case, the test apparatus 100 compares a portion obtained by removing the mask region "L" from the correct partial image "K" and a portion obtained by removing the mask region "l" from an object partial image "k". This enables an accord determination ignoring the mask regions. The test apparatus 100 specifies also the mask regions using the image ID as a key as described above, so that even when the size of the mask region is changed, the test apparatus 100 can correctly specify the mask region after the change of the size.

In the test apparatus 100 according to this embodiment, one of the above-described determination conditions can be set in units of object entire image for the object partial image. The test apparatus 100 can further set a different determination condition for each of a plurality of object partial images contained in the object entire image. Note that setting of the determination condition for each of the object partial images has been already completed before execution of the verification processing. Further, setting of the determination condition for each of the object partial images is performed, for example, by the CPU 101 recording the determination condition, for example, in the ROM 102 while associating the determination condition with the image ID according to a user operation. As another example, the determination condition may be defined in association with the image ID as the specification information on the verification object in a verification program.

Figure 12:
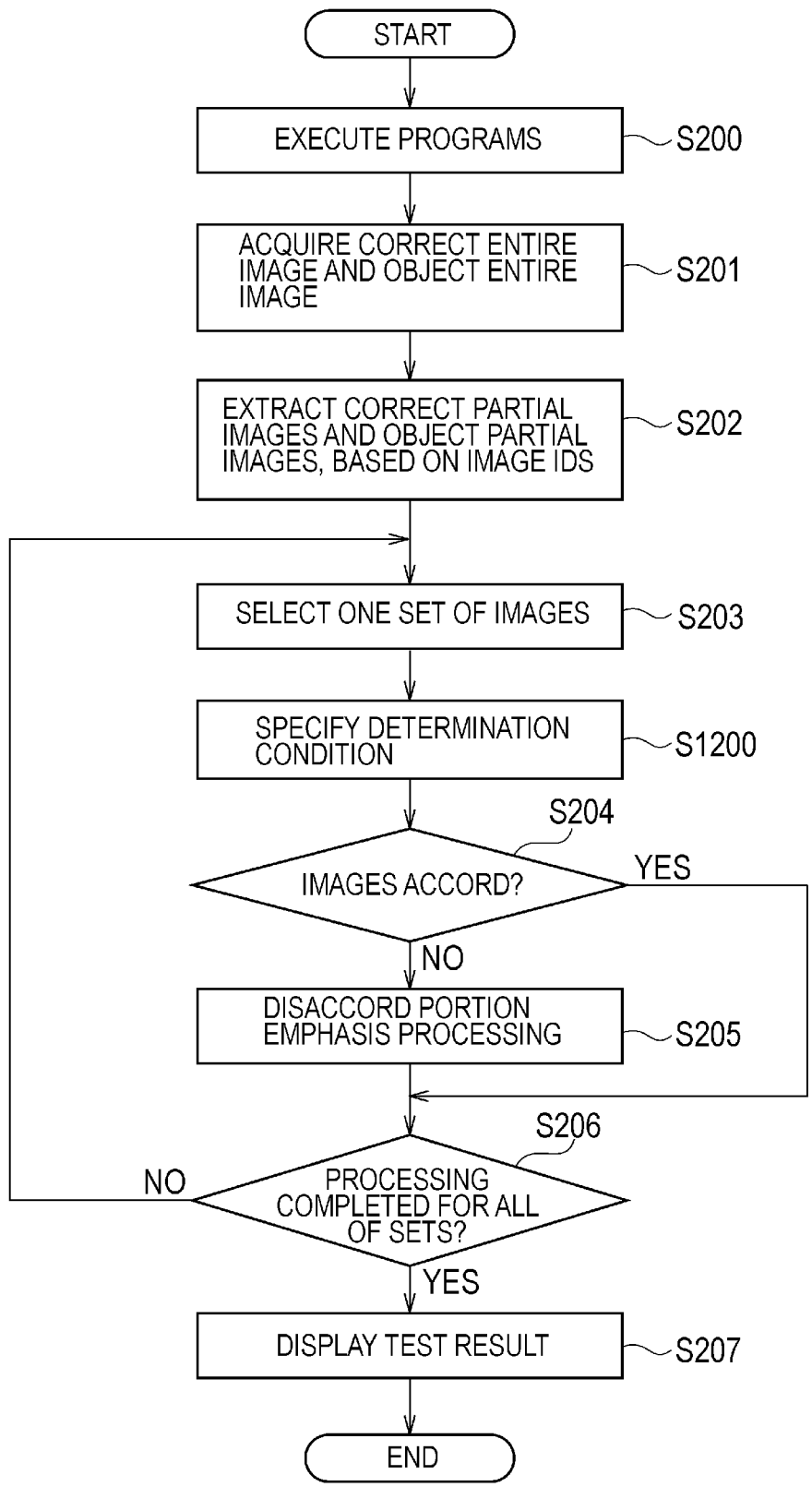
FIG. 12 is a flowchart illustrating verification processing according to a second embodiment.

FIG. 12 is a flowchart illustrating the verification processing by the test apparatus 100 according to the second embodiment. Note that the same processing as each processing of the verification processing (FIG. 2) according to the first embodiment is denoted by the same numeral. The CPU 101 selects a set of the partial images at S203, and then advances the processing to S1200. At S1200, the CPU 101 specifies the determination condition set for the selected object partial image. The CPU 101 then advances the processing to S204. At S204, the CPU 101 determines whether or not both the images accord according to the determination condition specified at S1200. Note that the configuration and processing other than the above of the test apparatus 100 according to the second embodiment are the same as the configuration and processing of the test apparatus 100 according to the first embodiment. The CPU 101 according to the second embodiment can determine whether or not each of the plurality of object partial images with the correct partial images according to different determination conditions as described above.

Third Embodiment

Next, a test apparatus 100 according to a third embodiment will be described. In a verification program executed in the test apparatus 100 according to the third embodiment, a class is defined as specification information on a verification object. A CPU 101 extracts a correct partial image group composed of a plurality of correct partial images drawn according to a description associated with a class defined in the verification program, of descriptions of an HTML text of an object program. The CPU 101 similarly extracts an object partial image group composed of a plurality of object partial images drawn according to a description associated with a class defined in the verification program, of the descriptions of the HTML text of the object program. The class mentioned here is one example of an attribute. Hereinafter, the test apparatus 100 according to the third embodiment will be described about points different from the test apparatuses 100 according to other embodiments.

Figure 13:
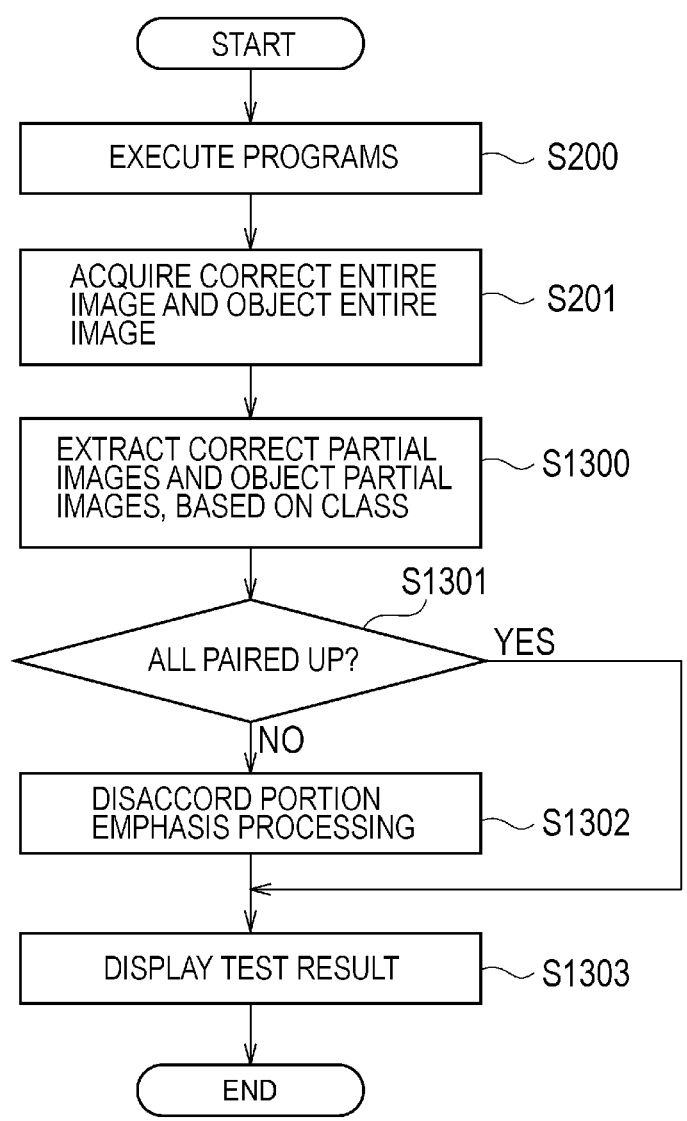
FIG. 13 is a flowchart illustrating verification processing according to a third embodiment.

FIG. 13 is a flowchart illustrating verification processing by the test apparatus 100 according to the third embodiment. Note that the same processing as each processing of the verification processing (FIG. 2) according to the first embodiment is denoted by the same numeral. After the processing at S201, the CPU 101 advances the processing to S1300. At S1300, the CPU 101 extracts partial images specified based on a predetermined class as the correct partial images from a correct entire image. The CPU 101 further extracts partial images specified based on the same class as the class referred to when extracting the correct partial images, as the object partial images from an object entire image.

Next, at S1301, the CPU 101 compares each of the object partial images extracted at S1300 with each of the correct partial images extracted at S1300 to thereby specify the correct partial image to be paired up with each of the object partial images. The CPU 101 confirms whether or not all of object partial images and correct partial images extracted at S1300 have been paired up with each other. The CPU 101 performs full search for the correct partial images and thereby detect the correct partial image to be paired up with each of the object partial images.

Figure 14:
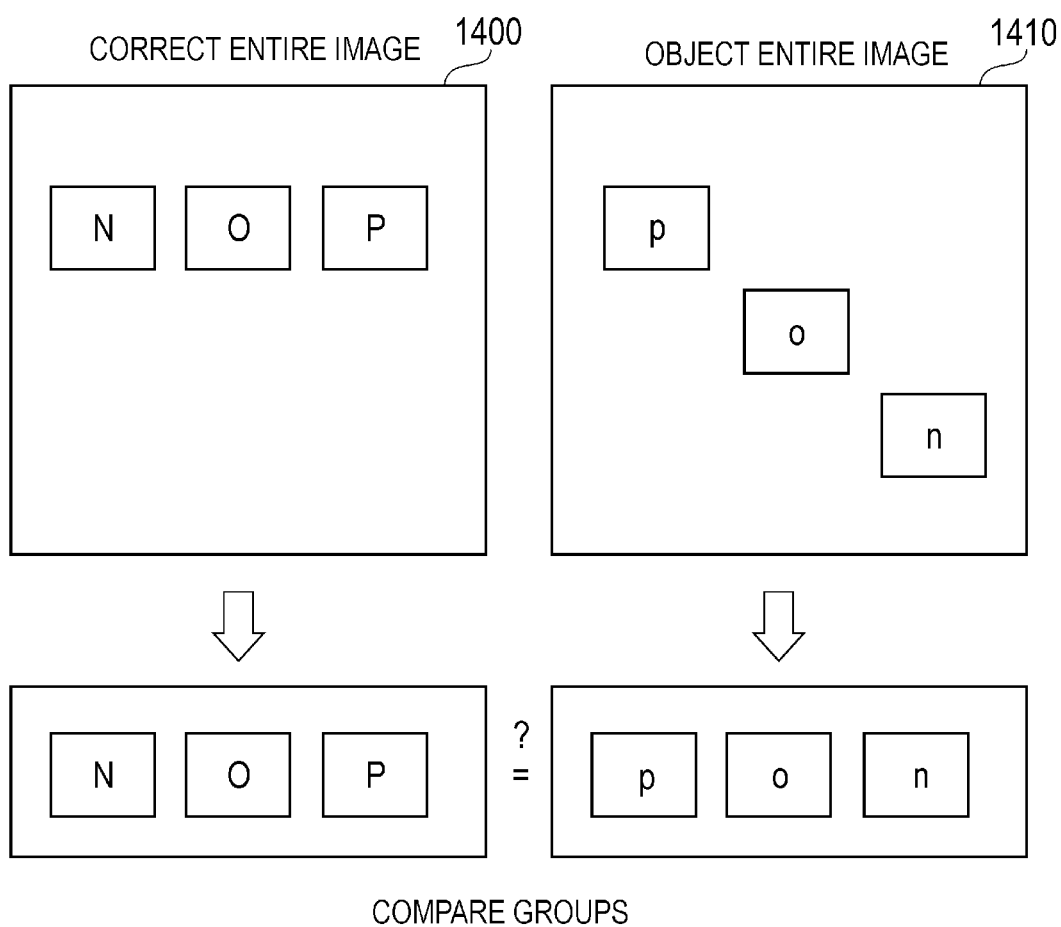
FIG. 14 is a view illustrating examples of a correct entire image group and an object entire image group.

For example, it is assumed that a correct partial image group including correct partial images "N", "O", "P" is extracted from a correct entire image 1400 and an object partial image group including object partial images "n", "p", "o" is extracted from an object entire image 1410 as illustrated in FIG. 14. In this case, the CPU 101 retrieves a correct partial image to be paired up with the object partial image "p" first. More specifically, the CPU 101 selects one partial image among three correct partial images. For example, when selecting the correct partial image "N", the CPU 101 compares the object partial image "p" and the correct partial image "N". When both the images do not accord, the CPU 101 selects the correct partial image "O", and when both the images do not accord again, the CPU 101 selects the correct partial image "P". Then, when the object partial image "p" and the correct partial image "P" accord, the CPU 101 determines that both the images pair up with each other. Through the same processing, the CPU 101 retrieves correct partial images to be paired up with the object partial images "o", "n".

When all of the object partial images and correct partial images extracted at S1300 are paired up with each other (Yes, at S1301), the CPU 101 advances the processing to S1303. When at least one of an unpaired object partial image and an unpaired correct partial image exists (No at S1301), the CPU 101 advances the processing to S1302. Examples of the unpaired case mentioned here include a case where some or all of the object partial images and correct partial images do not accord and a case where the number of object partial images and the number of correct partial images do not accord so that corresponding partial images (object partial images or correct partial images) do not exist.

At S1302, the CPU 101 executes emphasis processing on a disaccord portion. For example, in the case where some or all of the object partial images and correct partial images do not accord, the CPU 101 regards portions not according or the whole images as disaccord portions, and executes emphasis processing on the disaccord portions. Besides, in the case where the number of object partial images and the number of correct partial images do not accord, the CPU 101 regards partial images (object partial images or correct partial images) for which partial images to be paired up therewith have not been searched as disaccord portions, and executes emphasis processing on the disaccord portions. Note that the configuration and processing other than the above of the test apparatus 100 according to the third embodiment are the same as the configurations and processing of the test apparatuses 100 according to other embodiments.

Note that the test apparatus 100 described in this embodiment may be realized by a system composed of a plurality of apparatuses connected over a network. In other words, execution of the verification program, correct program, and object program by the test apparatus 100 may be individually performed by different apparatuses. Besides, execution of programs, image display, storage of image file may be individually performed by different apparatuses.

According to the above-described embodiments, it is possible to appropriately execute verification of a program including a description relating to drawing of an image.

Preferred embodiments of the present invention have been described above, but the present invention is not limited to those specific embodiments and can be variously modified and changed within a scope of the present invention described in claims.

The invention claimed is:

1. An information processing apparatus comprising:
   a first acquirer configured to acquire a first image displayed on a display in response to execution of an object program being a test object;
   an object image extractor configured to inquire of a browser a position of a partial image in the first image, based on a first image identifier, specify position of a region where the partial image is drawn, based on a response from the browser, and extract the partial image at the specified position as an object image, the first image identifier being information identifying the partial image included in the first image and being information specifying a partial image corresponding to a correct image;
   a determiner configured to determine whether or not the object image and the correct image accord; and
   a display processor configured to display a result of determination by the determiner.

2. The information processing apparatus according to claim 1, further comprising:
   a second acquirer configured to acquire a second image displayed on the display in response to execution of a correct program; and
   a correct image extractor configured to extract a partial image as a correct image from the second image, based on specification information specifying the partial image of the second image.

3. The information processing apparatus according to claim 1, wherein the object image extractor extracts a partial image drawn according to a description as the object image, the description being associated with the first image identifier in the object program.

4. The information processing apparatus according to claim 2, wherein:
   the specification information is a second image identifier being information identifying the correct image included in the second image; and
   the correct image extractor extracts a partial image drawn according to a description as the correct image, the description being associated with the second image identifier in the correct program.

5. An information processing apparatus comprising:
   a first acquirer configured to acquire a first image displayed on a display in response to execution of an object program being a test object;
   an object image extractor configured to inquire of a browser positions of a plurality of partial images in the first image, based on attribute information, specify each position of a region where each of the plurality of partial images is drawn, based on a response from the browser, and extract the partial image at specified each position as an object image, the attribute information being information indicating a class common to the plurality of partial images included in the first image and being information indicating that the partial images correspond to a correct image;
   a determiner configured to determine whether or not each of a plurality of the object images and each of a plurality of the correct images accord; and
   a display processor configured to display a result of determination by the determiner.

6. The information processing apparatus according to claim 5, wherein the determiner determines whether or not the object image and the correct image accord, based on a result of comparison between pixels of the object image and the correct image.

7. The information processing apparatus according to claim 5, wherein the determiner determines whether or not the object image and the correct image accord, based on a result of comparison between an edge detected from the object image and an edge detected from the correct image.

8. The information processing apparatus according to claim 5, wherein the determiner determines that the object image and the correct image accord when a part of the object image and the correct image accord.

9. The information processing apparatus according to claim 5, wherein the determiner determines that the object image and the correct image accord when a region except a part of the object image and a region except a part of the correct image accord.

10. The information processing apparatus according to claim 5, wherein the determiner determines whether or not each of a plurality of object images and a correct image accord, according to a different determination condition, the different determination condition being set in advance for each of the plurality of object images.

11. An information processing method executed by an information processing apparatus, the information processing method comprising:
    a first acquisition step of acquiring a first image displayed on a display in response to execution of an object program being a test object;
    an object image extraction step of inquiring of a browser a position of a partial image in the first image, based on a first image identifier, specifying a position of a region where the partial image is drawn, based on a response from the browser, and extracting the partial image at the specified position as an object image, the first image identifier being information identifying the partial image included in the first image and being information specifying a partial image corresponding to a correct image;
    a determination step of determining whether or not the object image and the correct image accord; and
    a display processing step of displaying a result of determination at the determination step.

12. A non-transitory computer readable recording medium with a program causing a computer to execute:
    a first acquirer configured to acquire a first image displayed on a display in response to execution of an object program being a test object;
    an object image extractor configured to inquire of a browser a position of a partial image in the first image, based on a first image identifier, specify a position of a region where the partial image is drawn, based on a response from the browser, and extract the partial image at the specified position as an object image, the first image identifier being information identifying the partial image included in the first image and being information specifying a partial image corresponding to a correct image;
    a determiner configured to determine whether or not the object image and the correct image accord; and
    a display processor configured to display a result of determination by the determiner.

13. The information processing apparatus according to claim 1, wherein the determiner determines whether or not the object image and the correct image accord, based on a result of comparison between pixels of the object image and the correct image.

14. The information processing apparatus according claim 1, wherein the determiner determines whether or not the object image and the correct image accord, based on a result of comparison between an edge detected from the object image and an edge detected from the correct image.

15. The information processing apparatus according claim 1, wherein the determiner determines that the object image and the correct image accord when a part of the object image and the correct image accord.

16. The information processing apparatus according to claim 1, wherein the determiner determines that the object image and the correct image accord when a region except a part of the object image and a region except a part of the correct image accord.

17. The information processing apparatus according to claim 1, wherein the determiner determines whether or not each of a plurality of object images and a correct image accord, according to a different determination condition, the different determination condition being set in advance for each of the plurality of object images.

* * * * *